US009017165B2

(12) United States Patent
Johnson et al.

(10) Patent No.: US 9,017,165 B2

(45) Date of Patent: *Apr. 28, 2015

(54) WAGERING GAME, GAMING MACHINE, NETWORKED GAMING SYSTEM AND METHOD WITH A SIMULTANEOUS SECONDARY GAME

(71) Applicant: Multimedia Games, Inc., Austin, TX (US)

(72) Inventors: Bradley W. Johnson, Austin, TX (US); Allison L. Pope, Austin, TX (US); Brian A. Watkins, Austin, TX (US); Clint Owen, Austin, TX (US); JP Cody, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/108,048

(22) Filed: Dec. 16, 2013

(65) Prior Publication Data

US 2014/0100035 A1 Apr. 10, 2014

Related U.S. Application Data

(63) Continuation of application No. 13/221,819, filed on Aug. 30, 2011, now Pat. No. 8,608,546.

(60) Provisional application No. 61/413,433, filed on Nov. 13, 2010.

(51) Int. Cl.
*A63F 13/10* (2006.01)
*G07F 17/32* (2006.01)

(52) U.S. Cl.
CPC .......... *G07F 17/326* (2013.01); *G07F 17/3262* (2013.01)

(58) Field of Classification Search
USPC .................................................... 463/30, 31
See application file for complete search history.

(56) References Cited

U.S. PATENT DOCUMENTS

| | | | | |
|---|---|---|---|---|
| 5,222,736 | A * | 6/1993 | Workman et al. | 273/123 R |
| 6,869,361 | B2 | 3/2005 | Sharpless et al. | |
| 6,984,174 | B2 | 1/2006 | Cannon et al. | |
| 7,753,777 | B1 | 7/2010 | Giuffria et al. | |
| 7,922,579 | B2 | 4/2011 | Walker et al. | |
| 8,070,587 | B2 | 12/2011 | Davis et al. | |
| 8,152,632 | B2 | 4/2012 | Fong | |
| 8,187,089 | B2 | 5/2012 | Englman et al. | |
| 2004/0152503 | A1 | 8/2004 | Lind et al. | |
| 2008/0045295 | A1 | 2/2008 | Walker et al. | |
| 2009/0197659 | A1 | 8/2009 | Christensen | |
| 2010/0210339 | A1 | 8/2010 | Chamberlain et al. | |
| 2010/0240436 | A1 | 9/2010 | Wilson et al. | |
| 2011/0105218 | A1 | 5/2011 | Anderson et al. | |
| 2012/0094739 | A1 | 4/2012 | Louie | |
| 2012/0122545 | A1 | 5/2012 | Watkins et al. | |
| 2013/0065662 | A1 | 3/2013 | Watkins et al. | |
| 2013/0116032 | A1 | 5/2013 | Lutnick | |
| 2013/0150150 | A1 | 6/2013 | Allen et al. | |

* cited by examiner

*Primary Examiner* — Pierre E Elisca

(74) *Attorney, Agent, or Firm* — Russell D. Culbertson, Esq.; JP Cody, Esq.

(57) ABSTRACT

A system, apparatus, and method are disclosed in which a gaming machine provides both a base game and a side game which may be played and wagered upon concurrently or according to some play sequence. The base game may be one type of game displayed on a portion of a primary display of the gaming machine and the side game may be a different type of game displayed on a remaining portion of the primary display.

16 Claims, 15 Drawing Sheets

WAGERING GAME, GAMING MACHINE, NETWORKED GAMING SYSTEM AND METHOD WITH A SIMULTANEOUS SECONDARY GAME

CROSS-REFERENCE TO RELATED APPLICATION

The Applicants claim the benefit, under 35 U.S.C. §119(e), of U.S. Provisional Patent Application No. 61/413,433 filed Nov. 13, 2010, and entitled "Wagering Game, Gaming Machine, Networked Gaming System And Method With A Simultaneous Secondary Game." The entire content of this provisional application is incorporated herein by this reference.

The Applicants also claim the benefit, under 35 U.S.C. §120, of U.S. patent application Ser. No. 13/221,819 filed Aug. 30, 2011, and entitled "Wagering Game, Gaming Machine, Networked Gaming System And Method With A Simultaneous Secondary Game." The entire content of this nonprovisional patent application is incorporated herein by this reference.

COPYRIGHT NOTICE

A portion of the disclosure of this patent document contains material which is subject to copyright protection. The copyright owner has no objection to the facsimile reproduction of the patent document or the patent disclosure as it appears in the U.S. Patent and Trademark Office patent files or records, but otherwise reserves all rights of copyright whatsoever.

BACKGROUND OF THE INVENTION

1. Field of the Invention

This invention relates to wagering games, gaming machines, networked gaming systems and associated methods. More particularly, the invention relates to wagering games, gaming devices, networked gaming systems, and associated methods including simultaneously operable and distinct primary and secondary games.

2. Description of the Related Art

A large number of different gaming machines have been developed to provide various formats and graphic presentations for conducting wagering games and presenting wagering game results.

There continues to be a need for wagering games which maintain the player's interest and generate excitement to enhance the player's gaming experience.

SUMMARY OF THE INVENTION

The present invention includes wagering games, gaming machines, networked gaming systems and methods with a secondary (or side) game operable simultaneously with the primary game.

These and other features of the invention will be apparent from the following description of the illustrative embodiments considered along with the accompanying drawings.

DESCRIPTION OF ILLUSTRATIVE EMBODIMENTS

Figure 1:
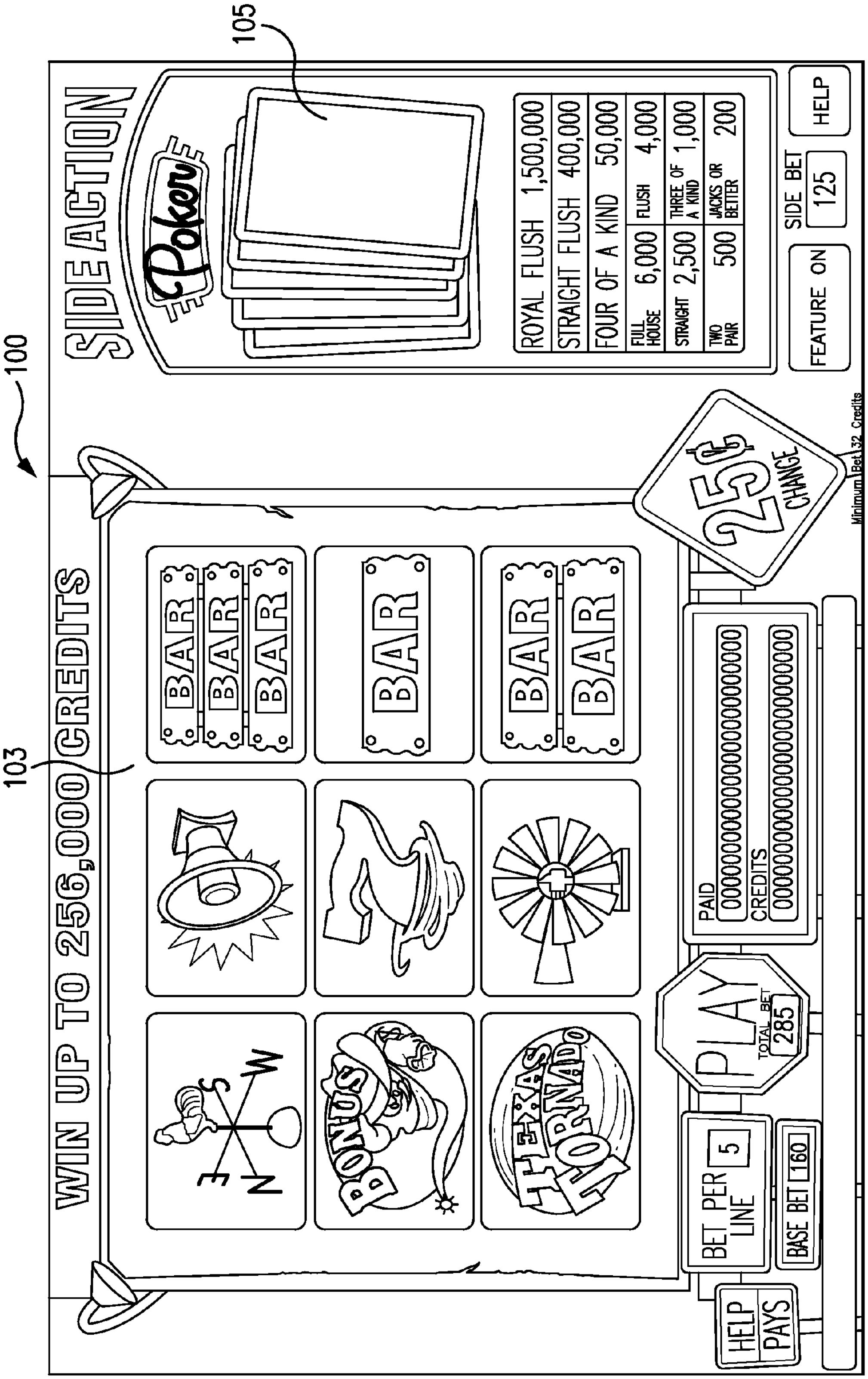
FIG. 1 is a representation of a wagering game graphic including an example reel-type game (Multimedia Games' Texas Tornado™) and an example side game (card game) with an undisclosed card hand, both games being separately wagered upon and simultaneously operable in accordance with one or more embodiments of the present invention.

Referring to FIG. 1 (and generally FIGS. 1A-1E), a primary display device 100 is shown displaying an example base game 103 (Multimedia Games' Texas Tornado™ 3-Reel Video Game) and example side game 105 (Multimedia Games' Side Action™ Stud Poker game) in accordance with one or more embodiments of the present invention. Side game 105 has an undisclosed card hand and is operating in an attract mode together with its associated paytable. Depending upon the embodiment, both games 103 and 105 may be wagered upon with a single collective or separate wagers, simultaneously or sequentially be operable by one or more processors, have outcomes determinable either by a single random number generator (RNG) or independent RNGs (or other result generation techniques), and have awards paid separately or collectively. For example, a selectable button may be provided for a player to place a wager on base game 103 plus side game 105, while another selectable button may be provided for a player to place a wager on just base game 103. In another example, another selectable button may be provided for a player to place a wager on just side game 105. A game processor (or game processors) may accept the wager input (or inputs), and the player may press a 'PLAY' button to initiate play of the game. Alternatively, the game processor may automatically initiate play of the game once a wager has been entered and credits deducted by the processor in an acceptance of the wager. In further examples, once the game is initiated, the processor may use a single RNG to determine a total game outcome which may include a base game, side game, or both game outcomes. Alternatively, a separate RNG may be operable by a processor to determine an outcome for base game 103 and another RNG may be operable by a processor to determine an outcome for side game 105, depending on which games are initiated in a given game play. In yet another alternative, a single RNG may be operable by a processor to determine a base game outcome, if wagered upon in a given game play, and the same RNG may be separately operable by a processor to determine a side game outcome, if wagered upon in a given game play. For example, the RNG may be operable to randomly determine a number from a range of numbers, the range of numbers may be correlated to a set of possible base game outcomes and may be separately correlated to a set of possible side game outcomes. In the event of one or more winning outcomes of base game 103 and side game 105, the associated awards may be applied to a credit meter or a player's account, or paid to the player directly.

In one or more embodiments, one or more outcomes in base game 103 may provide one or more free plays of side game 105. Alternatively, or in addition to outcomes in base game 103 providing one or more free plays in side game 105, an outcome or various outcomes available in side game 105 may provide one or more free plays in base game 103.

In one or more embodiments, a player selectable menu may be provided for a player to select one of several available side games such as side game 105 shown in FIG. 1. The side game may be a particular card game, dice game, wheel game, or reel game, for example.

In one or more embodiments, base game 103 and/or side game 105 may include one or more progressive jackpots which may be linked to a pool specific to the player, the associated gaming device, or to a network of gaming devices. For example, various levels of awards may be potentially won by a player in a given game and the highest award (or other award) associated with the given game outcome may be a progressive award. In another example, side game 105 may comprise a progressive game with a set of reels wherein each reel has a special progressive symbol, the reels are spun during each game play, and a winning game outcome may occur when each of the reels show the special progressive symbol which then results in the associated progressive award being provided to the player. In another embodiment, several progressives may be available and played for during each play of side game 105. For example, a red, blue, and gold progressive may be respectively associated with a smallest, middle, and largest progressive award. During each game play in the respective game, that is, the base game 103 or side game 105, one or more sets of reels may include a special progressive symbol and be associated with each progressive and spun either simultaneously (in the case when there are multiple sets of reels, each associated with a different progressive award) or consecutively (in the case when a single set of reels is used. Following each spin the reels may be modified to change the special progressive symbol to associate with a respective progressive award (for example, red, blue, and gold).

A side game in accordance with the present invention may be a separate game from the base game as shown in the example arrangement of base game 103 and side game 105 in FIG. 1 et. seq. In other embodiments, however, a side game may comprise one or more separate wagers other than payline wagers on outcomes of a base game such as base game 103. For example, separate wagers may be available to the player for the appearance of three or more symbols in the display (a scatter outcome) and an award may be provided to the player, if wagered upon during a base game play. In other embodiments, a base game such as base game 103 may have other aspects that may be separately wagered upon through the side game. For example, a base game may comprise a craps game where a series of dice rolls may provide opportunities for a player to place separate wagers on each roll of the dice. In other embodiments, a base game may comprise a reel, dice, or card game, and the side game may comprise a different reel, dice, or card game. For example, a base game may comprise a reel-type game such as base game 103 in FIG. 1, while a side game may comprise a craps game which may or may not offer subsequent bets after an initial roll of the dice.

Display device 100 may be a conventional video display device (for example, a landscape mode display with a 9×6 aspect ratio) with a touch-sensitive user interface. Example implementations may include dedicated gaming machines (e.g. a Multimedia Games™ wide body 23" video display cabinet), networked tablet computers (e.g. Apple iPad), networked personal computers, etc. on which base game 103 and side game 105 may be displayed. The games may be displayed under the control of a local or remote game processor configured to execute reel and side game coding responsive to player inputs (e.g. wager and game play requests). The graphic shown in FIG. 1 is an example in which the display area is larger for the base game 103 (about ⅔ of the display area of display 100) and smaller for side game 105 (about ⅓ of the display area of display 100). However, there is no limitation as to the relative display space taken up by a base and side game according the present invention. Also, in one or more embodiments, display device 100 may be controllable (for example, via touch screen controls) to allow the player to modify the display area of the respective games. For example, display device 100 may comprise a touch screen display and may allow the modification of the screen area taken up by base game 103 and side game 105 in response to a touch in the area of the border between the games and a slide of the touch horizontally in either direction to increase or decrease the display areas of the respective games. In one or more embodiments, the display area or window associated with either of the games may be moveable by a player from one position to another, such as by tapping the area of the display associated with a given game and sliding the player's finger to a position where the player desires to view the selected game (i.e. similar to a Microsoft® Windows® application wherein a window may be re-positioned or its size modified according to the user's preference). In a further variation, the given game window may be modified in size by the player selecting a corner of the game window and sliding it inward or outward to shrink or enlarge the given game display. For example, a player may tap the display area associated with side game 105 in FIG. 1 and slide a finger to a position centered at the top of display 100 and lift the finger from the display, touch a corner of the base game display area and slide the finger to re-size the area (such as to stack side game 105 above base game 103 on display 100). In a further embodiment, instead of enabling an individual to change sizes or positions directly, a display menu may be programmed to appear on display device 100 (such as by a player tapping a corner of display 100) and the display menu may provide a selection of base and side game size and position arrangements for a player to choose from. For example, a display menu may include a side-by-side box with base game 103 on the left and side game 105 on the right, a side-by-side box with base game 103 on the right and side game 105 on the left, stacked boxes with base game 103 on the top and side game 105 on the bottom, and stacked boxes with base game 103 on the bottom and side game 105 on the top whereon a player may select an image to move the positions of base game 103 and side game 105 on display 100 and the player may also have an option to increase or decrease the size of a given image by selecting the border area and sliding the player's finger along the screen in a horizontal direction (in the case of a side-by-side arrangement) or vertically (in the case of a stacked arrangement).

The dual games may be operated in a sequence, such as: a) when a "Play" control for the game is activated (i.e., the "Play" button is pressed) with a playing card-type side action active, the previous hand flips cards right to left then re-deals left to right; b) the reels stop and the Poker hand completes around the same time; c) reel stop wins are highlighted as usual; d) if side game 105 results in a win, the winning cards and corresponding paytable amount are highlighted; e) a bang up (e.g. coins falling into a tray) sound plays for the length of the combined wins (Poker & Reels) credited to the credit meter; and f) side game and reel game win highlighting continue (and winning sounds may play) until the player changes the bet or initiates the next play. Also, highlighting of base game 103 and side game 105 may remain after cash out from the gaming machine. Side game 105 may have some sounds and animations to correspond to game activity, for example, an anticipation sound may play as the card result is revealed, and, a special celebratory sound may play after a winning hand is revealed. There may also be different sounds for different prize levels (e.g. bottom 2 prizes, middle 2 prizes, top 3 prizes). Also, the gaming machine may produce a sound upon activation of side game 105 or at some other point associated with the side game.

In an example implementation in which side game 105 is inactive an animation plays over the side game display area instructing the player on how to make the side bet. For example, an instructional message may alternate with advertising information (e.g. Play 2 Games At Once!, For an additional side bet get the Side Action Game too!, 2 Games equals 2 Chances to Win on Each Spin!). Also, when side game 105 is inactive, the base game may play normally.

Figure 1A:
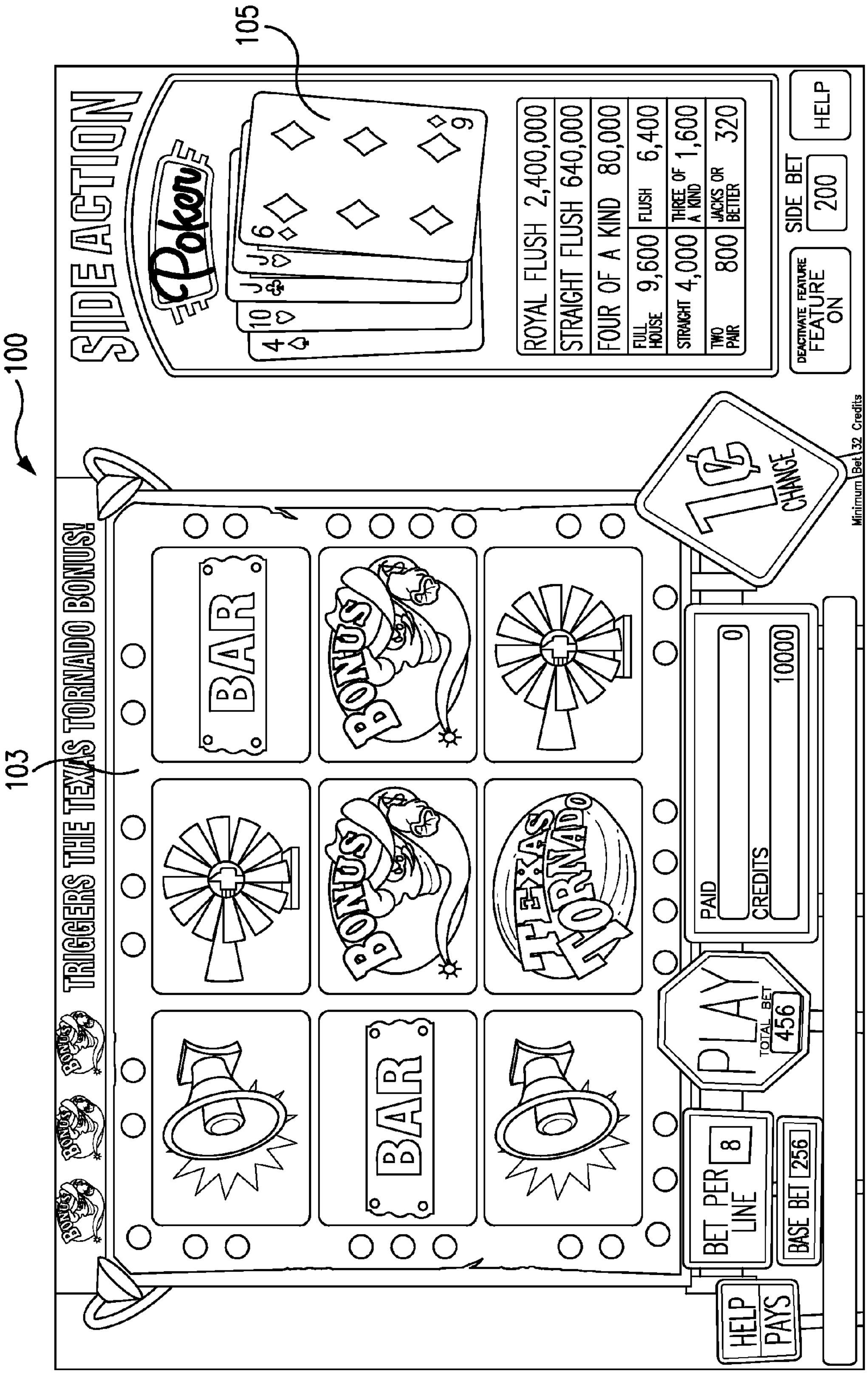
FIG. 1A is a representation of the example reel-type game and side game shown in FIG. 1 displaying a game outcome "pair of jacks."

FIG. 1A is a representation of an example primary display including the base game 103 comprising a reel game and the poker game-type side action game 105. In this example both base game 103 and side action game 105 display a respective game outcome with no winners. Both games are simultaneously or sequentially operable in accordance with one or more embodiments.

Figure 1B:
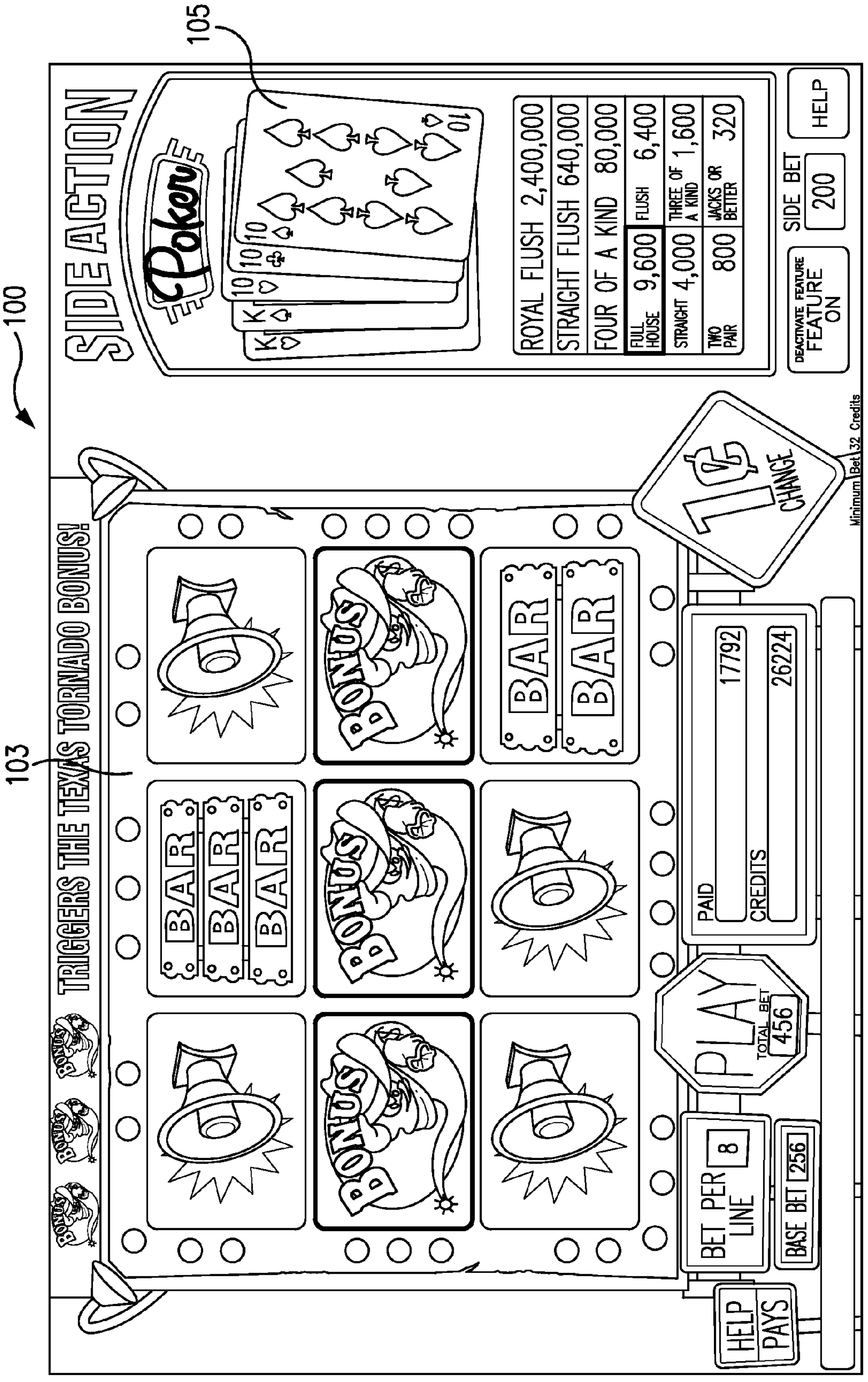
FIG. 1B is a representation of the example reel-type game and side game of FIG. 1, shown in a state in which the reel-type game has triggered a bonus and a winning outcome paying 8192 credits, the card game shows a full house winning outcome valued at 9600 credits, and the total paid being displayed as the sum of the two wins (17792 credits).

FIG. 1B shows another example of base game 103 and side game 105. In the case of FIG. 1B, the reel game comprising base game 103 is shown triggering a bonus and a winning outcome paying 8192 credits. The card game comprising side game 105 is shown in FIG. 1B with a result comprising a winning outcome (a full house) valued at 9600 credits. The total paid is displayed as the sum of the two wins (17792 credits), in accordance with one or more embodiments.

An example sequence where the base game 103 provides a bonus game may include: a) the base game bonus is triggered and begins a bonus game introduction; b) side game 105 produces its presentation (for example, the cards complete the reveal process at about the same time that the bonus intro begins); c) a transparent message may be displayed over the display of side game 105 to let the player know that the side game is paused temporarily until the bonus game associated with reel-type base game 103 is complete; d) once the bonus game is complete, side game 105 continues by providing any follow-up display or action, (for example, identifying the award for the side action game and producing a celebration or fanfare graphic and/or audio; and e) both games 103 and 105 show their respective awards and the total award at the end of play in the bonus game.

Figure 1C:
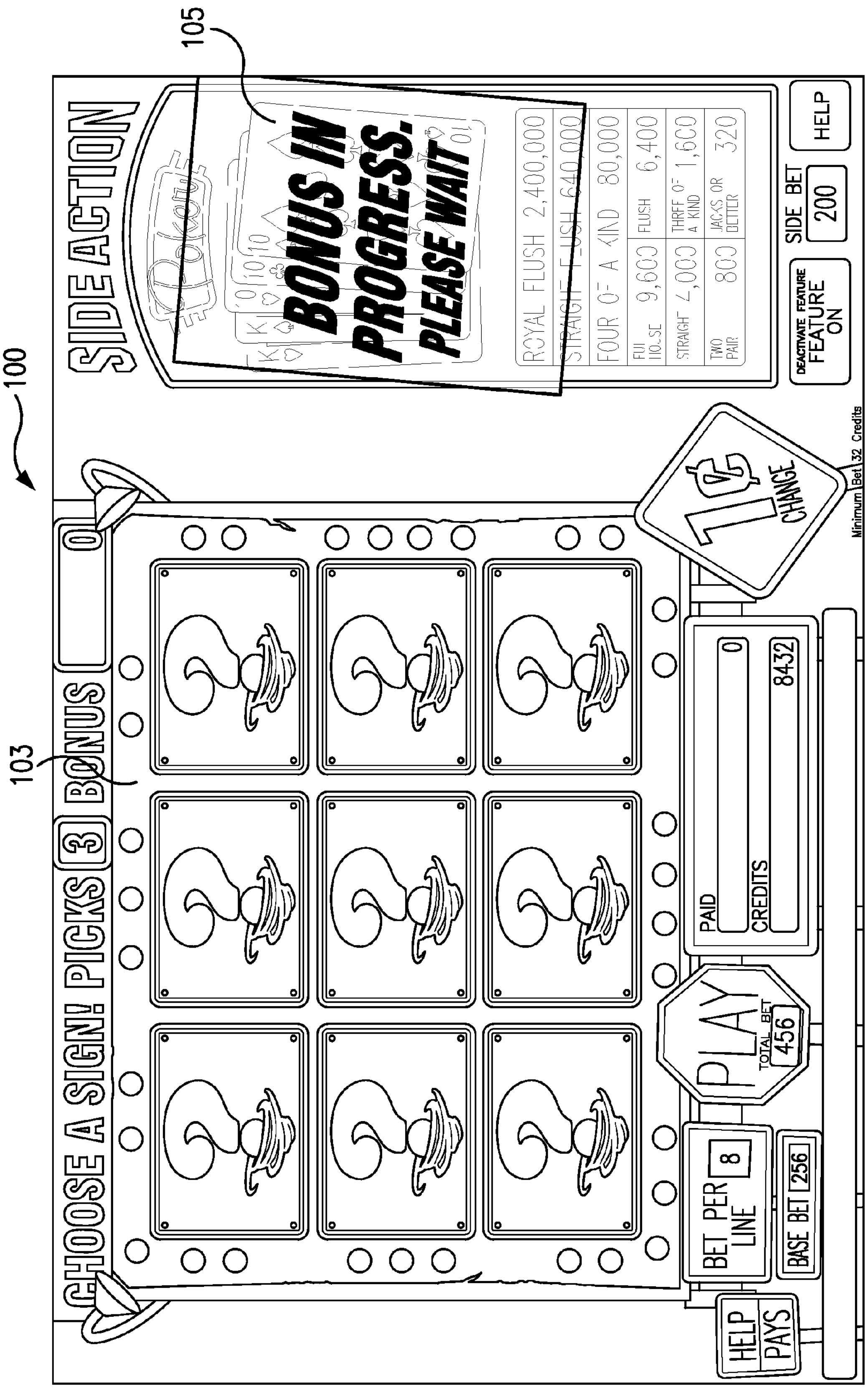
FIG. 1C is representation of the example reel-type game and side game of FIG. 1, shown in a state in which the side game (card game) is disabled during game play of the reel-type game bonus in accordance with one or more embodiments.

FIG. 1C provides an example graphic representation of the point in the sequence described in the preceding paragraph in which side game 105 is paused during the play of the bonus game provided in base game 103. In this particular example, the bonus game comprises a game in which the display area for the base game 103 changes to a player pick-type game.

Figure 1D:
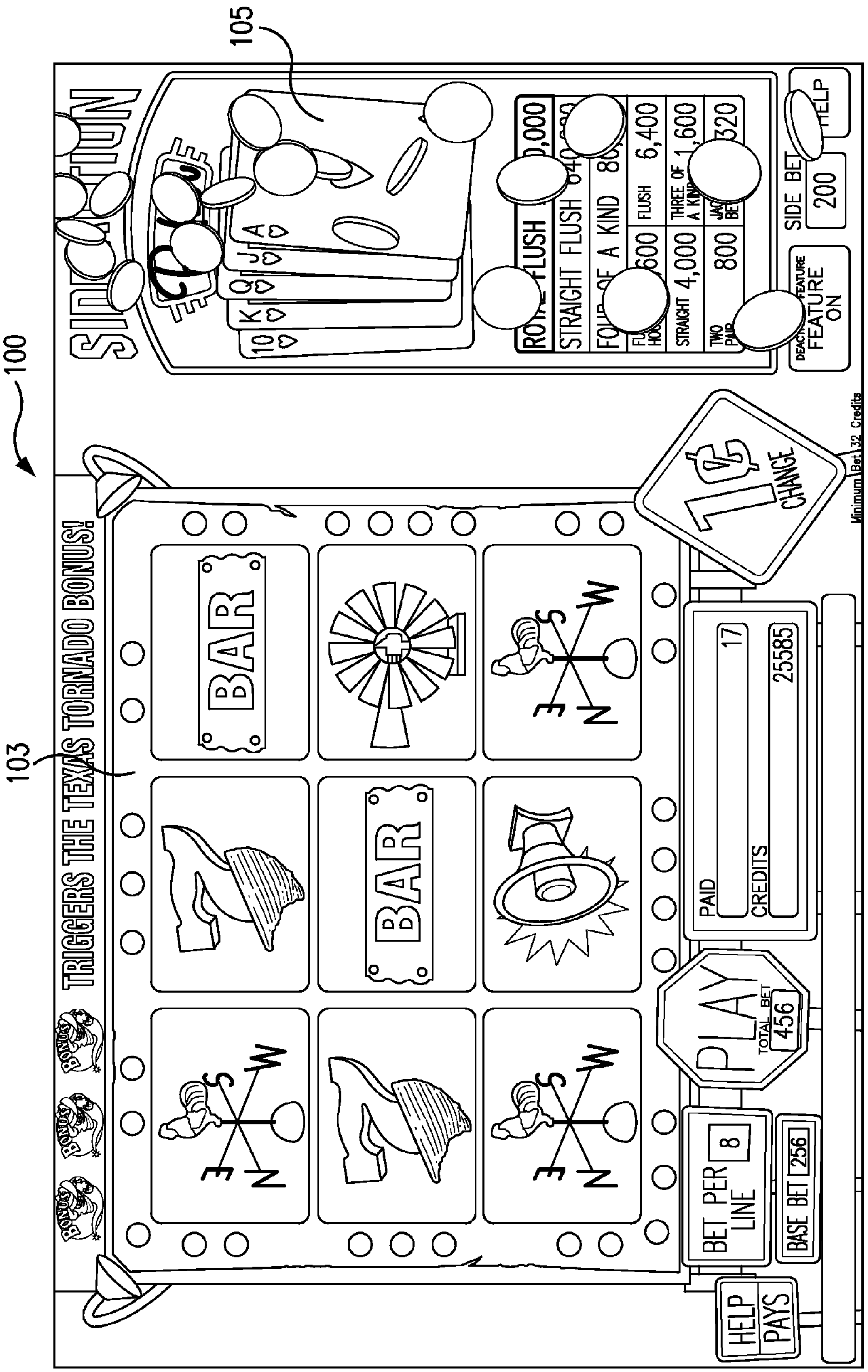
FIG. 1D is a representation of the example reel-type game and side card game of FIG. 1, shown in a state in which the card game shows a high award winning outcome and fanfare presentation in accordance with one or more embodiments.

FIG. 1D is a representation of base game 103 and side game 105 in which the card-type side action game produces a high award winning outcome and fanfare presentation. In this case the fanfare presentation includes a graphic showing gold coins being emitting from a source. The coins in the graphic may be directed upward in a fountain-style or may fall in a cascade or waterfall-style. Celebratory music or sounds may also be produced at the gaming machine in accordance with one or more embodiments.

Figure 1E:
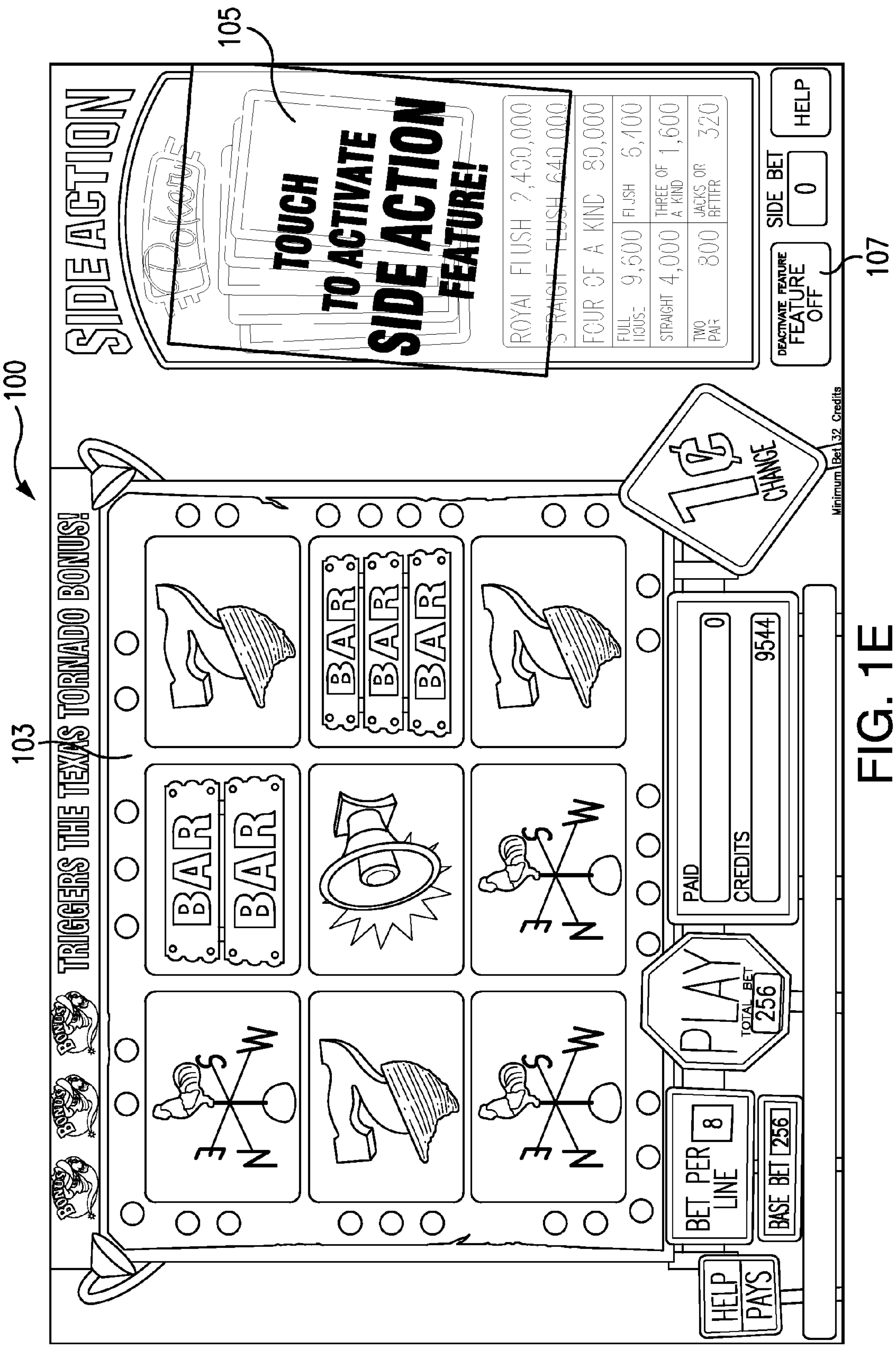
FIG. 1E is a representation of the example reel-type game and side card game of FIG. 1, shown in a state in which the side card game is inactive and activate-able by touch in accordance with one or more embodiments.

FIG. 1E shows a representation of base game 103 and side game 105 wherein the side game is inactive and activate-able by touch in accordance with one or more embodiments. For example, the area of display 100 showing side game 105 may be a touch sensitive panel and enabling the side game may be accomplished by a player touching anywhere on the side game area of display 100. To initiate play of side game 105, player may or may not be required to select a predetermined minimum wager (e.g. 'Max Bet' or maximum credits per line) of base game 103. In the event that a minimum wager of base game 103 is required, wagers associated with side game 105 may not be made; however, once a minimum wager has been made on base game 103, then one or more side game wager selections may be made available to the player to initiate side game 105. Following game play involving a play in both base game 103 and side game 105, a player may disable the side game by, for example, touching a Turn Feature Off button 107 in the side game area of display device 100.

Figure 1F:
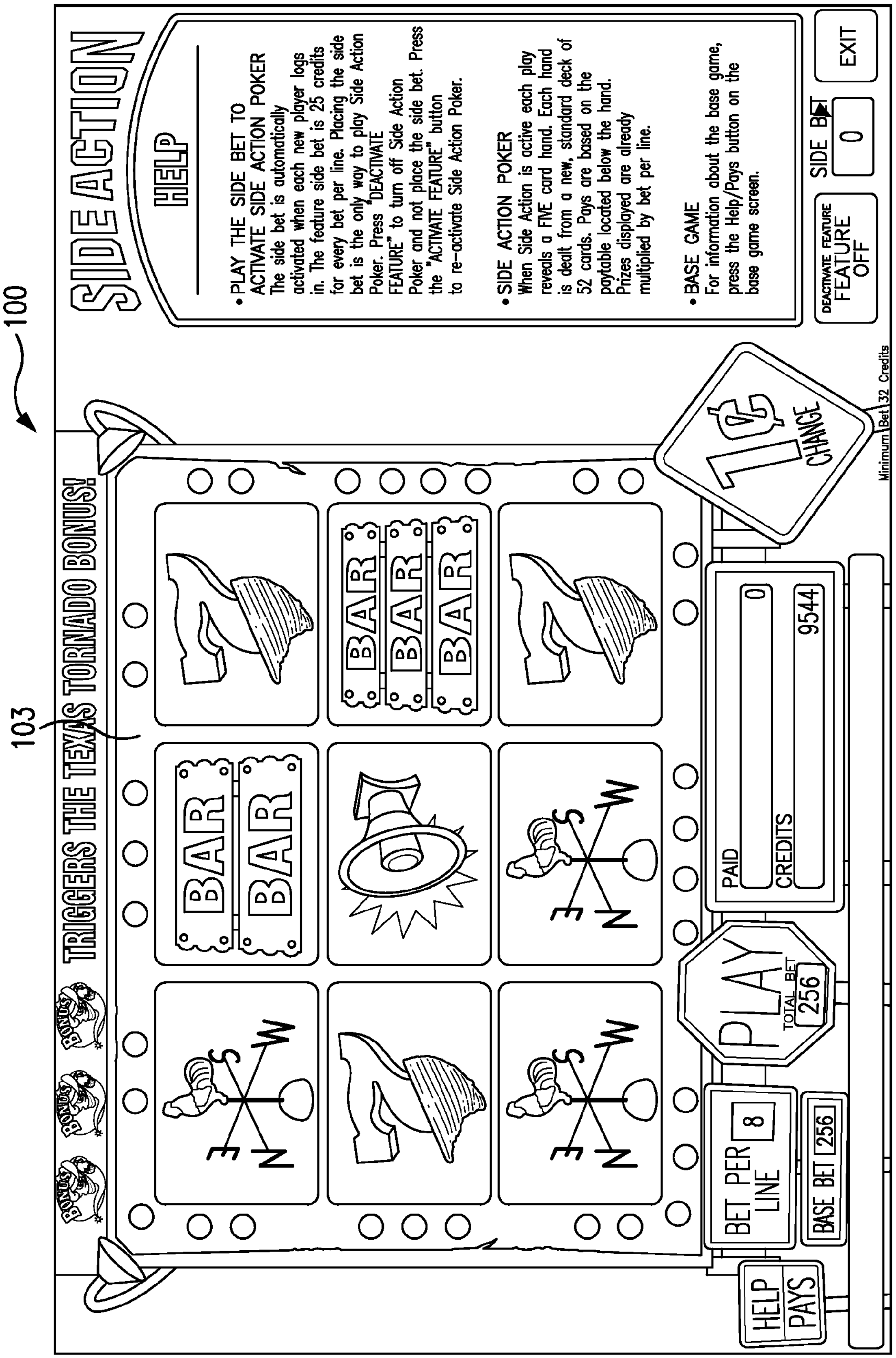
FIG. 1F is a representation of the example reel-type game and side card game of FIG. 1, shown in a state in which a side card game help screen is displayed in accordance with one or more embodiments.

FIG. 1F is a representation of a graphic in which the area of display device 100 used for the side game shows help information related to the side game. In this example, the reel-type base game 103 continues to be displayed while the help information is shown in the side game area of display 100.

Figure 1G:
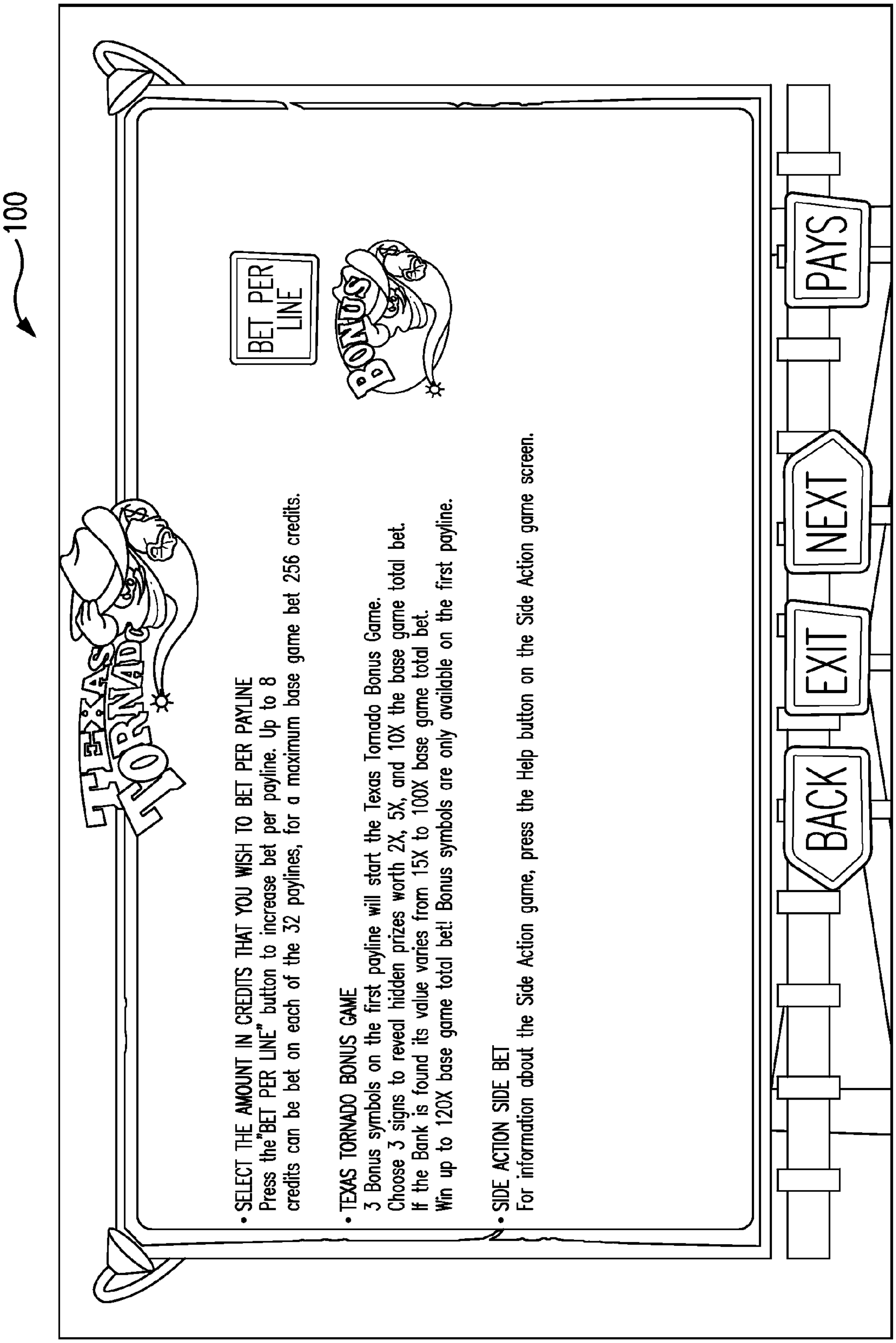
FIG. 1G is a representation of a help screen displayed for the example reel-type game and side card game of FIG. 1 in accordance with one or more embodiments.

FIG. 1G is a representation of an example help screen that may be shown for the previously described reel-type base game 103 and playing card-type side game 105. In this example, the help information takes up substantially the entire area of display device 100, and includes information for both the base game and the side game.

Figure 1H:
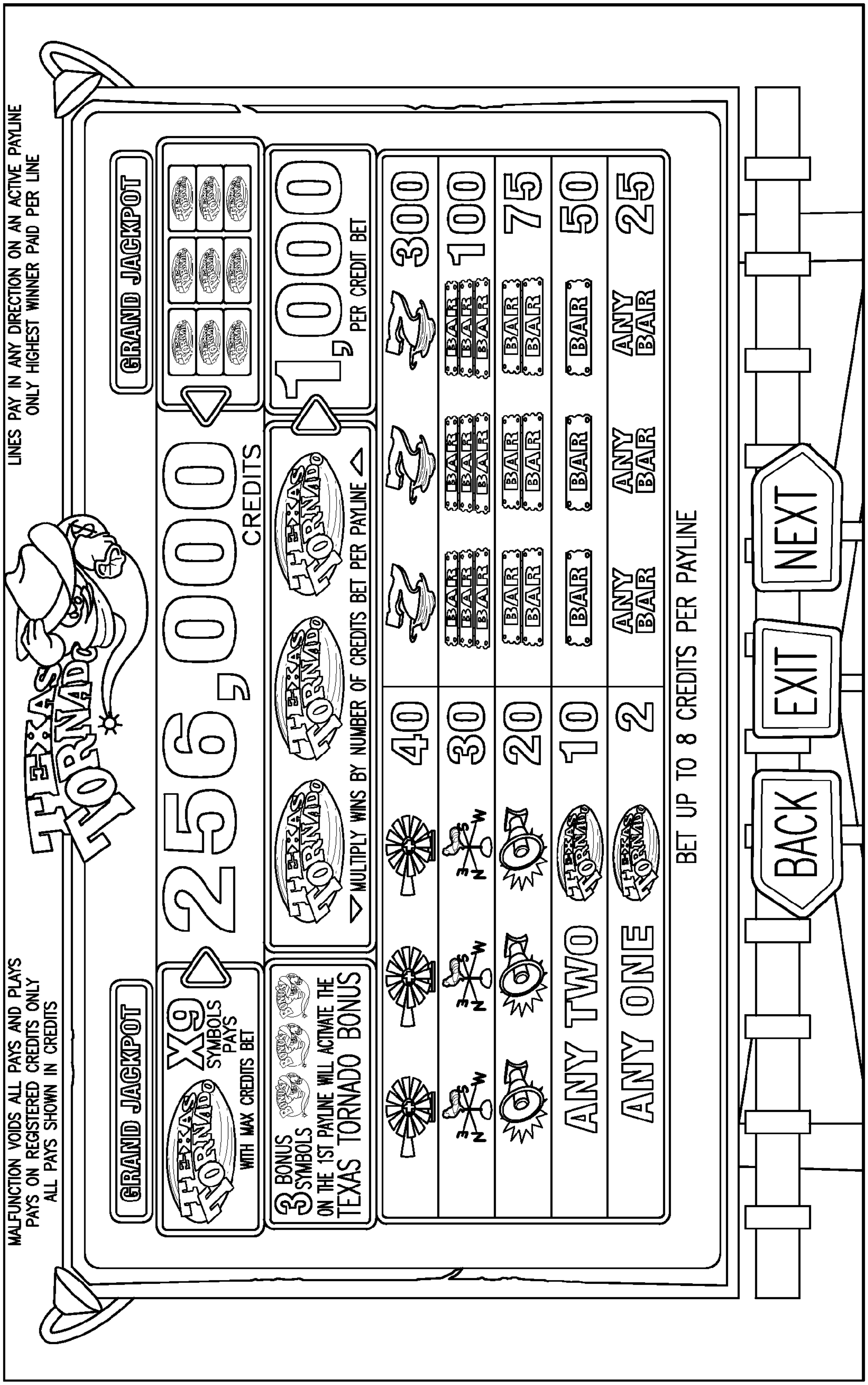
FIG. 1H is a representation of a paytable associated with the example reel-type game of FIG. 1 in accordance with one or more embodiments.

FIG. 1H is a representation of an example paytable associated with the reel-type base game 103 shown for example in FIG. 1 and other figures herein. This particular paytable comprises a screen of a help display shown on display device 100. It will be appreciated, however, that the paytable shown in FIG. 1H may be displayed elsewhere on the gaming machine.

In particular, the paytable for a reel-type game is commonly displayed in a display area of a gaming machine located above the primary display device.

Figure 1I:
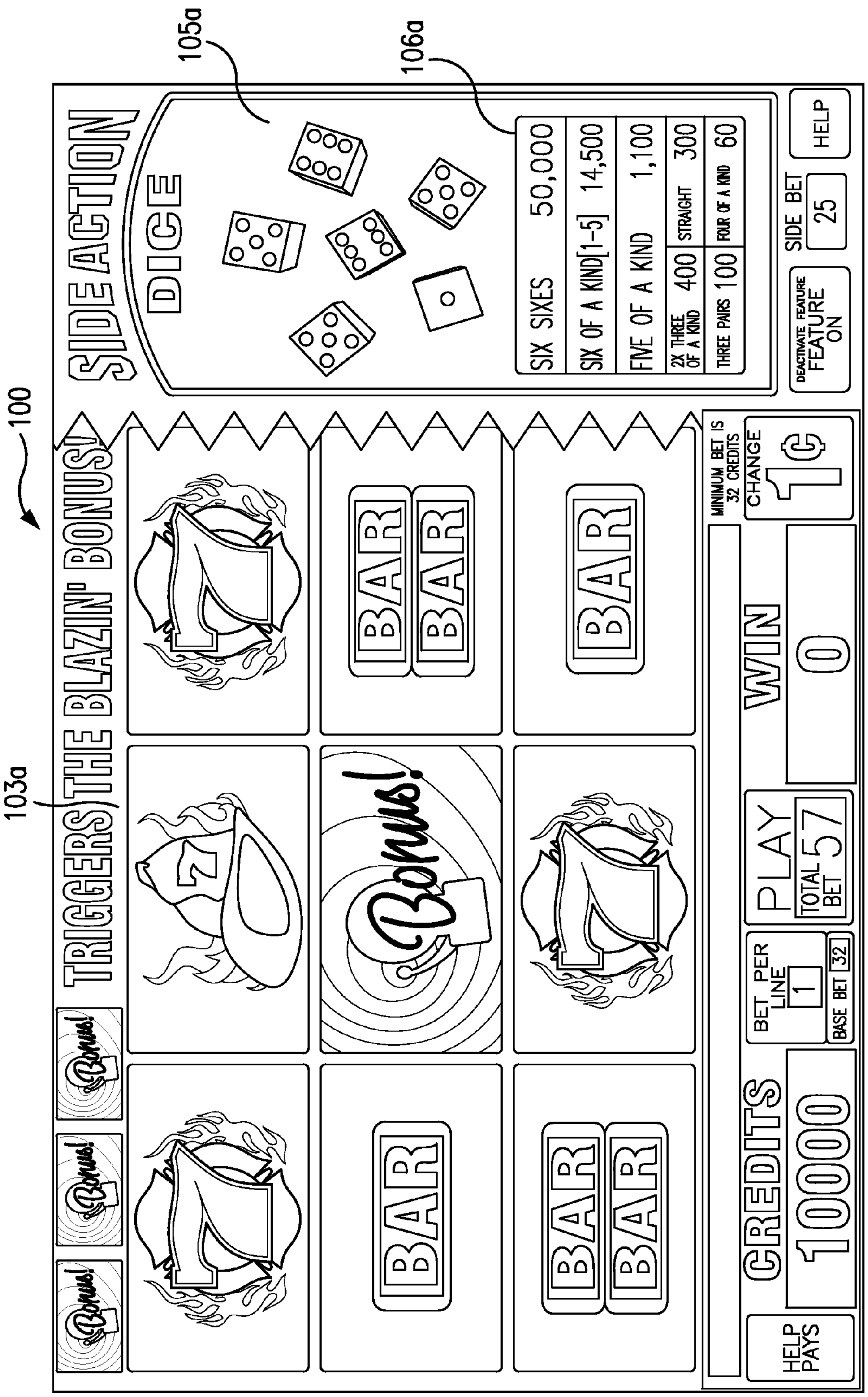
FIG. 1I is a representation of a second example reel-type game (Multimedia Games' Blazin' Bonus™) and a second example side game (dice game) in accordance with one or more embodiments.

FIG. 1I is a representation of a second example reel-type base game 103*a* (Multimedia Games® Blazin' Bonus™) and a second example side game 105*a* shown on display device 100 in accordance with one or more embodiments. In this example, side game 105*a* comprises a dice game as opposed to a playing card-type game.

In an example implementation in which the base game 103*a* and side game 105*a* are active, the following steps may occur: a) the player presses the on screen Bet Per Line button to change the value in the Bet Per Line window as well as the Base Bet & Total Bet; b) when the player presses the Play button with the side game 105*a* active, base game 103*a* proceeds normally (e.g. reels spin) and side game animation proceeds (e.g. dice roll); c) side game 105*a* concludes its animation (that is, the dice come to rest) before first reel lands in base game 103*a*; d) reel stop wins in base game 103*a* are highlighted according to programming of conventional play; e) win amounts in side game 105*a* are highlighted on the paytable portion 106*a* of the side game graphic; f) the gaming machine plays a bang up sound for the length of combined wins (dice and reels); g) the message bar will not include side game pay and side game pay will not be included in Total Credits won; h) the dice paytable 106*a* highlight and the reel-type game wins continue playing until the player changes their bet or initiates the next play and highlighting remains after cash out from the gaming machine; i) side game 105*a* may have some sounds and animations to correspond to game activity, for example, an anticipation sound may play as the dice result is revealed, and, a special celebratory sound may play after a winning roll is revealed. There may also be different sounds for different prize levels (e.g. bottom 2 prizes, middle 2 prizes, top 3 prizes). Also, there may be a sound associated with activating side game 105*a*.

In an example implementation in which base game 103*a* is played while side game 105*a* is inactive, an animation may play over side game 105*a* display area instructing the player on how to make the side bet, for example, an instructions message may alternate with advertising information (e.g. "Play 2 Games At Once!, For an additional side bet get the Side Action Game too!, 2 Games equals 2 Chances to Win on Each Spin!"). When side game 105*a* is inactive, base game 103*a* plays normally.

Figure 1J:
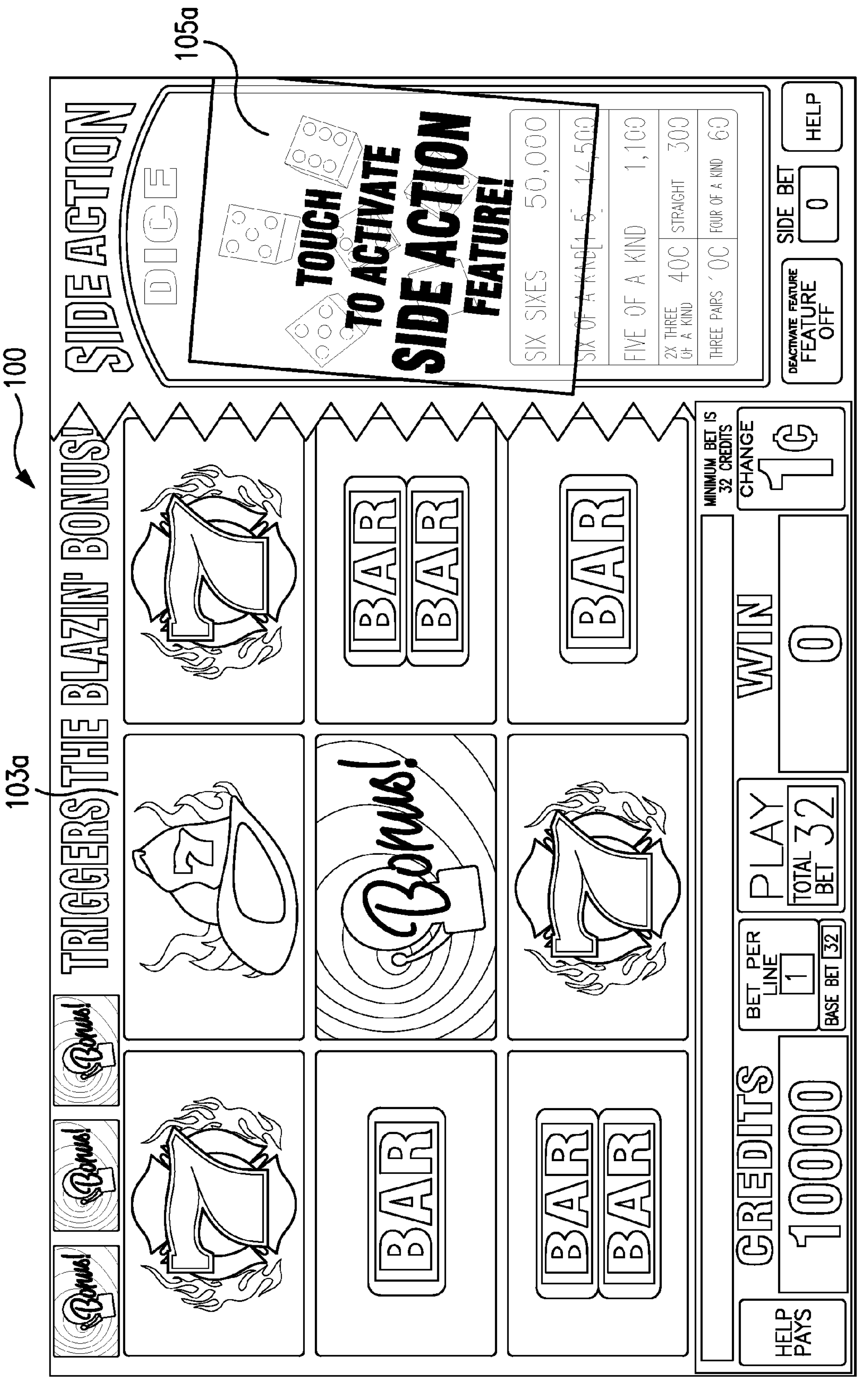
FIG. 1J is a representation of the example reel-type game and side dice game of FIG. 1J, shown in a state in which the side game (dice game) is shown inactive and activate-able by touch in accordance with one or more embodiments.

FIG. 1J shows an example representation of the graphic shown on display 100 in the case described in the preceding paragraph in which base game 103*a* plays normally while side game 105*a* is inactive. This particular graphic representation shows an instruction on how to activate side game 105*a* superimposed over the side game display area.

Figure 1K:
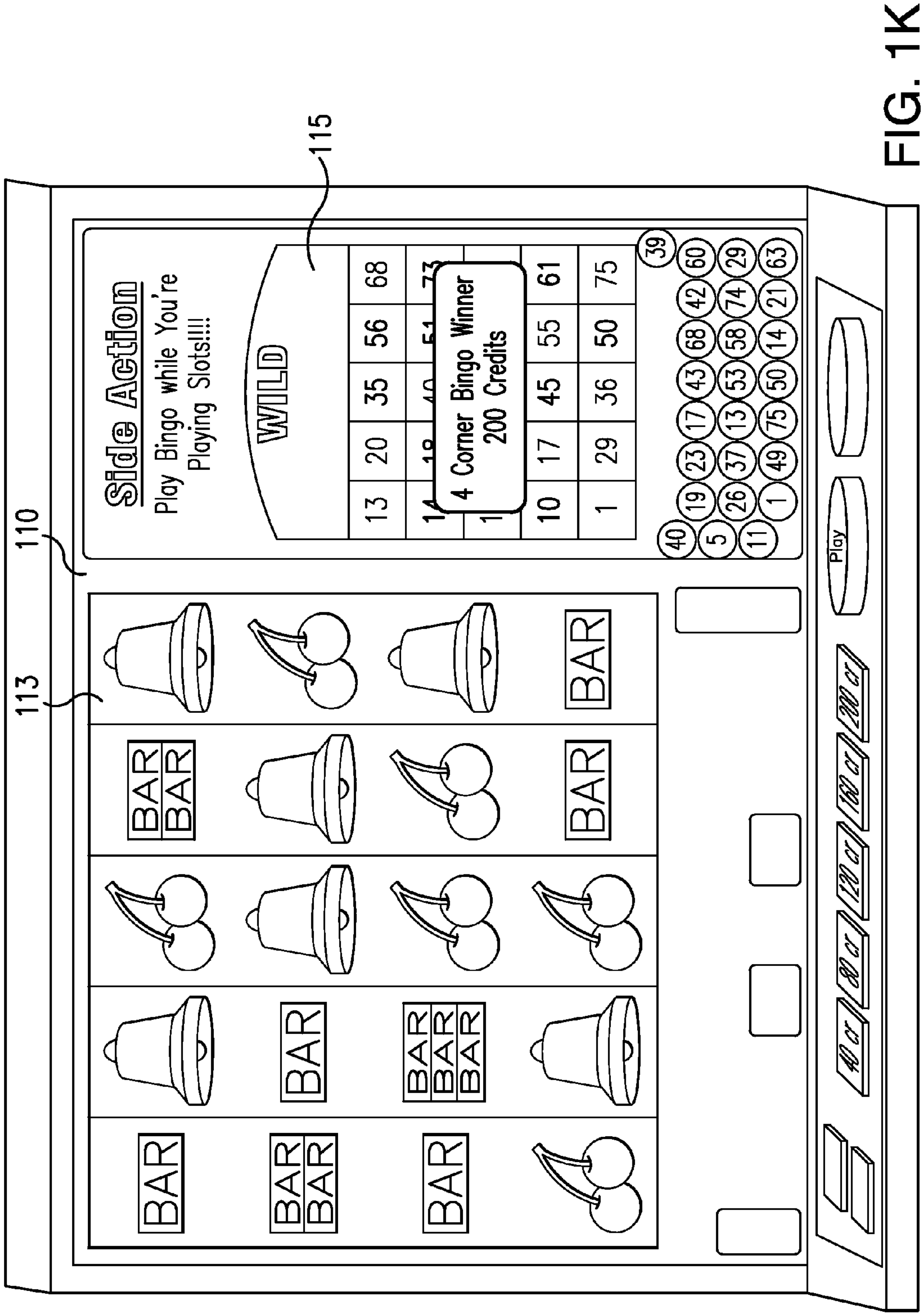
FIG. 1K is a representation of a generic reel-type game and a third example side game comprising a bingo game in accordance with one or more embodiments.

The somewhat diagrammatic representation of FIG. 1K shows an example of a reel-type game 113 shown on a display device 110 together with an example side game 115 comprising a bingo game in accordance with one or more embodiments.

Figure 2:
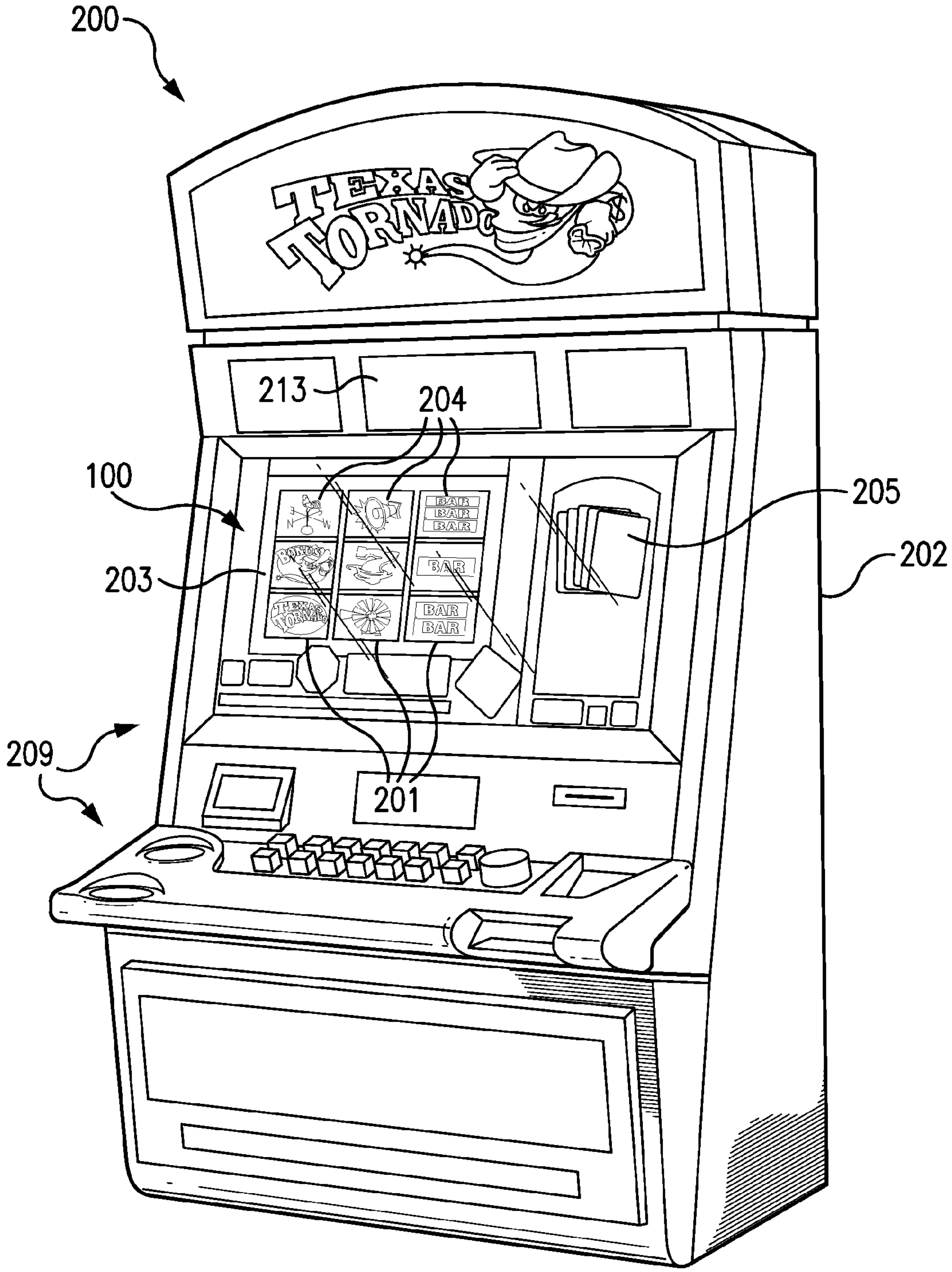
FIG. 2 is a front perspective view of an example upright gaming machine according to one or more embodiments.

Referring to FIG. 2, gaming machine 200, such as Multimedia Games® Texas Tornado™ with Poker Side Action M11 Video gaming machine, is shown including primary display device 100 with which a set of reels 201 are shown or displayed in a base game display area 203 and a poker hand is shown or displayed in a side game display area 205 in accordance with one or more embodiments. Primary display device 100 and the other components of gaming machine 200 are all mounted on or about a cabinet 202. During primary game operation or attract mode, a base game paytable may be displayed on display 100 (or another available display) by accessing the help screen (see for example FIG. 1H) to view various base game winning outcomes associated with various awards and additional information regarding game play including criteria or requirements to activate and/or play the side game shown in side game area 205. A side game paytable may also be shown through the base game help screen, through a separate help screen, or be directly viewable in the side game display area 205. In an alternative embodiment, a top box display may display the respective paytables of the base game, side game, or both.

Gaming machine 200 is also shown to include middle display 213 which may display a server-based game (such as bingo, in the case of a Class II gaming machine), advertising or other content as may be provided over a network or through the gaming machine. Gaming machine 200 further includes user interface 209 with which a patron may place wagers and initiate play of one or more games at gaming machine 200. User interface 209 may include: a commercially available player tracking interface unit, such as a Bally iView™ unit, a button deck including buttons for selecting paylines and wagers per payline in the base game shown in base game area 203, one or more additional buttons for selecting wagers associated with the side game shown in side game area 205, and a "Play" button and/or handle with which the player may initiate play of the games selected by the player. The button deck may be provided on a touch panel (such as on the lower portion of display device 100) in addition to or in the alternative to a physical button deck. The "Play" button/control may be also useable to simultaneously initiate a play in the base game shown in base game display area 203 and a play in the side game shown in side game area 205. The "Play" button/control may also or alternatively be operable to separately initiate play of the side game in side game display area 205 if the option is provided to play only the side game. The player tracking unit may include a card reader, a bill acceptor/printer, and player display which may display a greeting to the player, player points, a menu for communicating with player tracking server 409, and other casino operator content.

While gaming machine 200 is shown as an upright gaming machine cabinet style, various cabinet styles or device types may be utilized including a slant top cabinet style, a bar top cabinet style (where the cabinet may be part of a bar/table top and/or housed therein), a personal computer, or, a tablet, cell phone or other handheld device.

As in the reel games shown in the figures, each reel includes a series of symbols 204 viewable on display device 100 (e.g. through a glass window or transparent display, in the case of mechanical reels, or, as displayed in a video format). With the reels in a stationary position, the symbols visible on display device 100 represent an array of symbols through which various paylines may be defined. During a wagering game (as may be initiated by a player by placing a wager and pressing a "Play" button), the reels may be simulated to spin (or electro-mechanically spun in the case of mechanical reels) about an axle under the control of a game processor which randomly or pseudo-randomly determines the game outcome and causes the reels to stop in accordance with the determined game outcome. Alternatively, a game processor may randomly or pseudo-randomly stop the reels and then evaluate the displayed symbols in light of the applicable paytable to identify the reel-type game outcome. Further alternatives in providing outcomes for the reel-type base game and side game will be described further below.

One or more paylines, combinations, or patterns of the symbols including those visible in display 100 may be correlated to a game result payable in accordance with a paytable such as may be displayed with respect to base game shown in base game display area 203. For example, a game with five reels and displaying four symbol locations per reel may have four paylines which extend horizontally across each reel and many others which may zig and zag across the various reel symbol locations both on and off the viewable display area. A patron may wager on one or more of the paylines during each game play. Display device 100 may thereby be used to display game results to one or more patrons who may view gaming machine 200 and the game processor may make payment to the patron by incrementing a credit meter for winning outcomes of paylines in accordance with the paytable and the player's wager. In example gaming machine 200, only one payline may be provided horizontally across the three reels 201, and a player may be provided the option to bet one, two, or three credits on the payline to play the base game in base game display area 203, and a fourth or additional credits to the play side game displayed in side game display area 205. While example gaming machine 200 includes a set of three reels 201, various numbers of reels and paylines may be selected or utilized in an implementation of one or more embodiments, such as one, two, three, four, five, six, or seven reels, and so forth.

Primary display device 100 may comprise a single display device or may comprise two or more display devices (for example, two flat panel display devices in over- or underlaying relation to each other, or in a side-by-side arrangement). In some implementations, primary display device 100 may comprise a touch-sensitive display panel, such as a flat panel LCD or LED display, which may be programmed to display an opaque or thematic frame image (which may include video and/or still images) except over a reel display area. Primary display device 100 may be programmed to be transparent or translucent during game play of the primary wagering game, so that the patron may view the game presentation in the reel display area where a set of mechanical reels may be viewable or a set of video reels may be displayed by an underlying display. In addition, the entire display surface of primary display device 100 (or a portion thereof) may be configured to respond to the patron's touch such as to select paylines, select credits wagered per payline, and/or play the base game and/or side game.

In one or more alternative embodiments, primary display device 100 may be programmed to display a bonus or feature game (such as the pick-type, player interactive bonus game shown in FIG. 1C) that may be triggered by the appearance of one or more special symbols or other random event. For example, when a bonus or feature game is triggered, primary display device 100 (or a portion thereof) may be transformed to display content associated with the bonus or feature game and once the bonus or feature game is complete, primary display device 100 may revert to the primary game display state. In the player pick-type bonus game shown in FIG. 1C, a touch sensitive portion of display device 100 may be programmed to display player interactive elements such as, for example, a selection of buttons to enable player interactivity with the game. In particular, a player may use such touch screen portion to select the button or item in order to cause the game to perform additional steps and/or provide one or more bonus or feature game outcomes and awards to the player.

In one or more alternative embodiments, gaming machine 200 may include mechanical reels with fixed or dynamic symbols. Conventionally, mechanical reels include reel strips with fixed symbols. However, reel strips may be implemented using FOLED (flexible organic LED), for example, or comparable reel strips wherein one or more symbols may be programmed dynamically to vary the symbol and/or its appearance, either from one fixed image to another (such as changing a symbol to a wild symbol or changing a series of symbols to wild symbols), or, from a fixed image to a dynamic (e.g. animated or video) image or a set of miniature video reels. In various instances when a symbol changes to another symbol, a bonus or enhanced award may be paid in accordance with the paytable, or a bonus (a fixed or progressive amount) may be paid separate from the paytable.

In the event that the payment is a progressive, a progressive pool may be generated from an operator's marketing dollars or from play at one or more gaming machines which may be eligible for the progressive award. The progressive pool may be maintained by a progressive server (such as server 407 shown in FIG. 4). In cases when a progressive prize is associated with an individual gaming device, the progressive pool may be maintained through a processor (such as the game processor) associated with the gaming device. In cases when the progressive associated with a game is personal to the player, the amount of the progressive award may be maintained by a processor associated with the game while the player is playing the particular device, and when the player's gaming session ends, the amount accumulated towards the personal progressive award, if not won, may be forwarded to a server, such as player tracking server 409 in FIG. 4, which may forward the information to a subsequent device when the player returns to play or selects another gaming machine on which to play.

Another conventional game display approach is to implement reels virtually (video reels) on a display, such as primary display device 100 as shown in the figures discussed herein. In the case of virtual displays of the reels, the symbols may be fixed or animated on each of the reels. In one or more embodiments, the appearance of one or more special symbols in the base game shown in base game display area 203 may trigger a free play of the side game shown in side game display area 205 and provide an award according to the standard paytable. Alternatively, the side game paytable may be modified to provide an interactive element with the base game. For example, a multiplier symbol may appear on a winning payline or as a scatter symbol in the base game shown in base game display area 203, which may trigger the side game shown in side game display area 205 to modify one or more awards with a multiplier value (e.g. 1×, 2×, 3×, etc.). Alternatively or additionally, one or more free base game spins may provide a game presentation and outcome, and based on the outcome, an associated multiplier award may be applied to one or more paylines on the base game to determine the award that is paid to the player (e.g. credited to a credit meter on the gaming machine), which may be based on the currently displayed outcome and/or one or more subsequent base game plays. If two or more multiplier symbols appear in the base game, the multipliers associated with the side game paytable may be multiplied by two or more. In another example, one or more free spin symbols may appear in the base game which may trigger the side game to modify one or more awards in its paytable to include a number of free spins and depending on the side game outcome, the associated number of free spins may be applied to the base game. The associated number may be multiplied by the number of free spin symbols that appeared in the base game to trigger the side game, and the side game process may be repeated to add to the number of remaining base game free reel spins, if one or more free spin symbols appear on subsequent base game plays.

In one or more embodiments, a multiplier or number of free spins, as described above, may be saved for use at a later time in the gaming session or if the player doesn't use the multiplier or number of free spins during the gaming session, the multiplier and free spin information may be transmitted to a server (such as player tracking server 409 shown in FIG. 4), stored, and then transmitted from the server to a gaming device selected by the player at a later time. For example, the player may enter a player card into a gaming device card reader, which then communicates with player tracking server 409 to receive player information including any saved game information. In one or more embodiments, the multiplier and free spins may be used with the same game as previously played or, in some cases, may be used with one or more other games (such as games of the same denomination). In one or more embodiments, saved multipliers and/or free spins may be increased, such as by hitting a multiplier or free spin win additional times. For example, a player may win a 2× multiplier on a first win and subsequently win a 3× multiplier on a second win. The player may be able to then play a game with the 2× multiplier and play another game with the 3× multiplier. Alternatively, the multipliers may accumulate (for example, 2×+3×=5×) and the player may play a single game with a 5× multiplier. In one or more embodiments, the player may be provided the option to split up the multipliers in two or more games or play the multipliers in a single game. In a case when a player has accumulated multipliers totaling 6*x* or more, the player may have the option to split the multipliers into two games (for example, 2×, 4× or 3×, 3×) or three games (for example 2×, 2×, 2×) or to play the accumulated multiplier in a single game.

In one or more alternative embodiments, overlapping display panels may be implemented to generate video or display effects over the primary game reels. For example, the reel display area may be implemented as a transmissive (e.g. Aruze or WMS transmissive display panels) display or a transparent (e.g. Bally transparent display panels) display configured to display visual effects together (or cooperatively) with the primary reels under the control of the game processor during the operation of a wagering game. In the case of virtual reels, the virtual reels may be recessed a distance from an overlaying display and segregated by dividers similar to dividers separating mechanical reels, which may provide a spatial characteristic (e.g. IGT PureDepth® display panels). In either case, the overlapping display may be touch sensitive and configured to interact with the player by transmitting and receiving signals as described above.

In one or more embodiments, the game processor operating the wagering game and interacting with various peripheral components in many instances is implemented as a microprocessor, such as an Intel Pentium® or Core® microprocessor, on a printed circuit board including one or more memory devices positioned within gaming machine 200. In alternative implementations, the game processor may be remote from gaming machine 200, such as on a server network (game server 403 shown in FIG. 4 for example) connected to gaming machine 200, in which case the game operation as described herein may be accomplished through network communications to control the display of the game on gaming machine 200.

Figure 3:
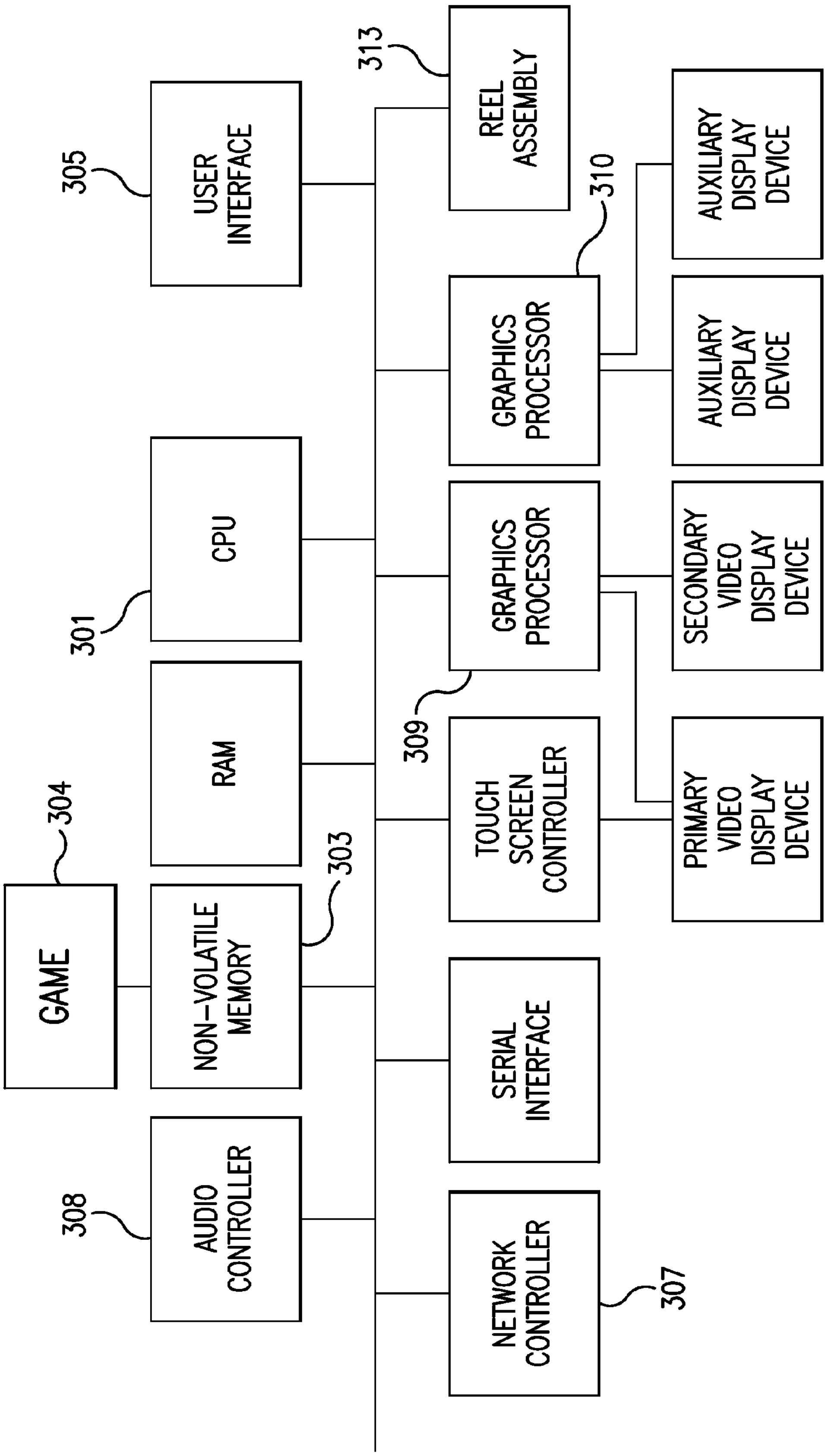
FIG. 3 is an example logic diagram of a gaming machine in accordance with one or more embodiments.

FIG. 3 shows an example logical diagram of gaming machine 200 and includes a CPU or game processor 301, memory 303 with wagering game 304, user interface 305, network controller 307, audio controller 308, graphics processors 309 and 310, and reel assembly 313. The reel assembly 313 will be included in gaming machine 200 if the gaming machine employs mechanical reels rather than or in addition to video-generated reels. Game processor 301 in this example implementation may comprise a conventional microprocessor, such as an Intel Pentium® or Core® microprocessor, mounted on a printed circuit board with supporting ports, drivers, memory, and coding to communicate with and control gaming machine operations, such as through the execution of coding stored in memory 303 including one or more wagering games 304. Game processor 301 connects to user interface 305 such that a player may enter input information and game processor 301 may respond according to its programming, such as to apply a wager and initiate execution of a game.

Game processor 301 also may connect through network controller 307 to a gaming network, such as example casino server network 400 which will be described below in connection with FIG. 4. Through its network connection, gaming machine 200 may be monitored by an operator through one or more servers such as to assure proper operation, and, data and information may be shared between gaming machine 200 and respective of the servers in the network such as to accumulate or provide player promotional value, to provide server-based games, or to pay server-based awards.

Generally, activity at gaming machine 200 is initiated by a player inserting currency and/or a player card into an appropriate receiving device such as a bill acceptor for currency and card reader for the player card. Upon insertion, a signal is sent to game processor 301. In the case of the insertion of a player card, the card reader transmits card information which is directed through network controller 307 to a player tracking server connected to the network in which the gaming machine is included. Player data is transmitted to gaming machine 200 and, responsive to the data, game processor 301 may execute coding causing player data and a display command to be transmitted to one of the graphics processors 309 or 310 instructing the graphics processors to cause player information to be displayed on a respective display. Game processor may also transmit commands to audio controller 307 to direct the controller to cause an audio greeting to be produced through one or more speakers associated with the gaming machine. Concurrently, the bill acceptor sends a signal to game processor 301 which may include an identification of the currency that has been read, and game processor 301 in accordance with its coding may convert the currency amount to credits and transmit a store and display signal to a credit meter and its associated display ("Credits", in FIG. 1 for example). Once credits have been associated with the credit meter, the player may select the number of paylines and credits per line that the player wishes to wager, whereupon game processor 301, in accordance with its program code, receives the wager information from user interface 305, transmits accounting and display information to the payline ("Lines"), credits per payline ("Bet per Line"), and total bet ("Total Bet") meters and displays of the gaming machine, transmits an update to the credit meter and display ("Credits") deducting the amount of the total bet, and initiates the wagering game.

In the case of a Class III gaming devices, when a game is initiated, a random number generator (RNG) may be operated by game processor 301 to determine the game outcome (either directly or by randomly selecting reel stop positions and evaluating those positions to identify an outcome). Commonly, game processor 301 is positioned within gaming machine 200 and configured to manage the operation of the gaming machine components, such as shown in FIG. 3. However, the game processor may be either onboard or external to a gaming device played by a player, such as an electronic tablet (e.g. Apple iPad® or gaming specific tablet), personal data assistant (PDA), cellular telephone (e.g. Blackberry® or Apple iPhone®), surface table (e.g. Microsoft®/IGT® touch sensitive gaming surface table), etc.. In such case, when the player places a wager and initiates play of the game through user interface 305 of the gaming device, the game processor may be onboard the device or remotely located such as within a network gaming server. In the latter case, an onboard microprocessor, controller, or digital signal processor may execute coding to transmit the wager and game request information through the network, and the remote game processor may operate an RNG to determine the game outcome.

In the case of Class II gaming devices, the overall structure of the various devices as discussed above is essentially the same with the major difference being the method of determining the game outcome. Commonly, Class II gaming devices utilize the game of bingo as the basis for determining a winning outcome where the ball draw is performed remotely by a network or central determination server (alternative games may be used for determining game outcomes, such as through a lottery drawing of a finite set of numbers, if permitted by the licensing jurisdiction). Class II gaming systems are commonly referred to a central determination systems wherein pools and sub-pools of game outcomes are determined by a central server (or gaming device) and distributed amongst a set of networked gaming devices. The distribution step may be on demand, such as when a gaming device receives a game request, or sets of game outcomes may be distributed to the various networked gaming devices in which case the game processor of the requesting gaming device may select a game outcome from the set of game outcomes, such as by using an RNG or other selection process.

Additionally, Class II gaming devices, such as a bingo-based gaming device may have multiple displays, such as are shown in FIG. 2 wherein one of the displays, such as display 213 in FIG. 2, may be used to display one or more electronic bingo cards and one or more ball drawings after a game has been initiated in accordance with the game outcome that has been provided to the gaming device by a central determination server. In the case, as in FIG. 2, where the primary display comprises a set of reels, game processor 301 converts the centrally-determined game outcome to a corresponding value outcome of the reel-based game as shown in FIG. 2 and operates the reel-based game as described above and with respect to the figures. In one or more embodiments, when a player enters a wager on both the base game 103 and side game 105 described above, and enters "PLAY" through an appropriate player control, a game play request may be transferred to central determination server 405 (discussed below in connection with FIG. 4) which may provide a single game outcome to the respective gaming machine 200. Game processor 301 may then initiate game presentations of both games concluding with outcomes corresponding to the game outcome provided by central determination server 405. In an alternative embodiment, central determination server 405 may provide two game outcomes (one associated with base game 103 and one associated with side game 105), and game processor 301 may initiate corresponding game presentations of base game 103 and side game 105.

In one or more embodiments, coding may be implemented and stored in memory 303 and/or 304, executable by game processor 301 to control game operation, display content, lighting, and audio through video, audio, reel drive motor controllers (for mechanical reels), and lighting controllers.

While the primary display has been depicted as displaying a set of reels, in one or more base game embodiments, base game 103 or side game 105 may comprise other types of games. For example, base game 103 or side game 105 may comprise a playing card-based game such as poker or blackjack, a dice-based game such as craps or a board game such as the Monopoly® game, a wheel-based game such as roulette or Wheel-of-Fortune® type prize wheel, or a competition-based game such as a car or horse race.

Also, while gaming machine 200 has been described as a stand-alone or networked game device, in one or more embodiments gaming machine 200 may be operable in a tournament or community gaming mode wherein players may compete for one or more awards or triggering of special features. For example, in one or more example configurations, one or more banks of gaming machines 200 may be networked connected to an overhead display which may display a feature game and when triggered, the player triggering the feature game may be indicated on the overhead display as the wheel-based game is played. In another example, side game 105 may be played conventionally with payouts according to the side game paytable and players who are linked in a community game may compete against each other during each play for additional awards. For instance, of the competing players, the player with the highest scoring hand of cards may receive a first award and a player with the second highest scoring hand of cards may receive a second award. In one or more embodiments, the side game outcome (for example, card hands in the case of poker) and respective player identifiers may be displayed on an overhead screen along with the awards paid to each participating player. In one or more embodiments, the participating players may be required to pay an additional fee to participate. For example, a network inquiry to play in the community game may be made on a player tracking display. If the player accepts the invitation for the community game, the player's account or gaming device credit meter may be debited accordingly. A community game controller may transmit a message to each participating player advising of their participation. In one or more embodiments, a player's highest side game outcome occurring during a selected time span may be used by the community game controller as the player's entry into the community competition or tournament. Base game 103 may be used as opposed to side game 105 for the community game and the same concepts may be applied as described above.

Figure 4:
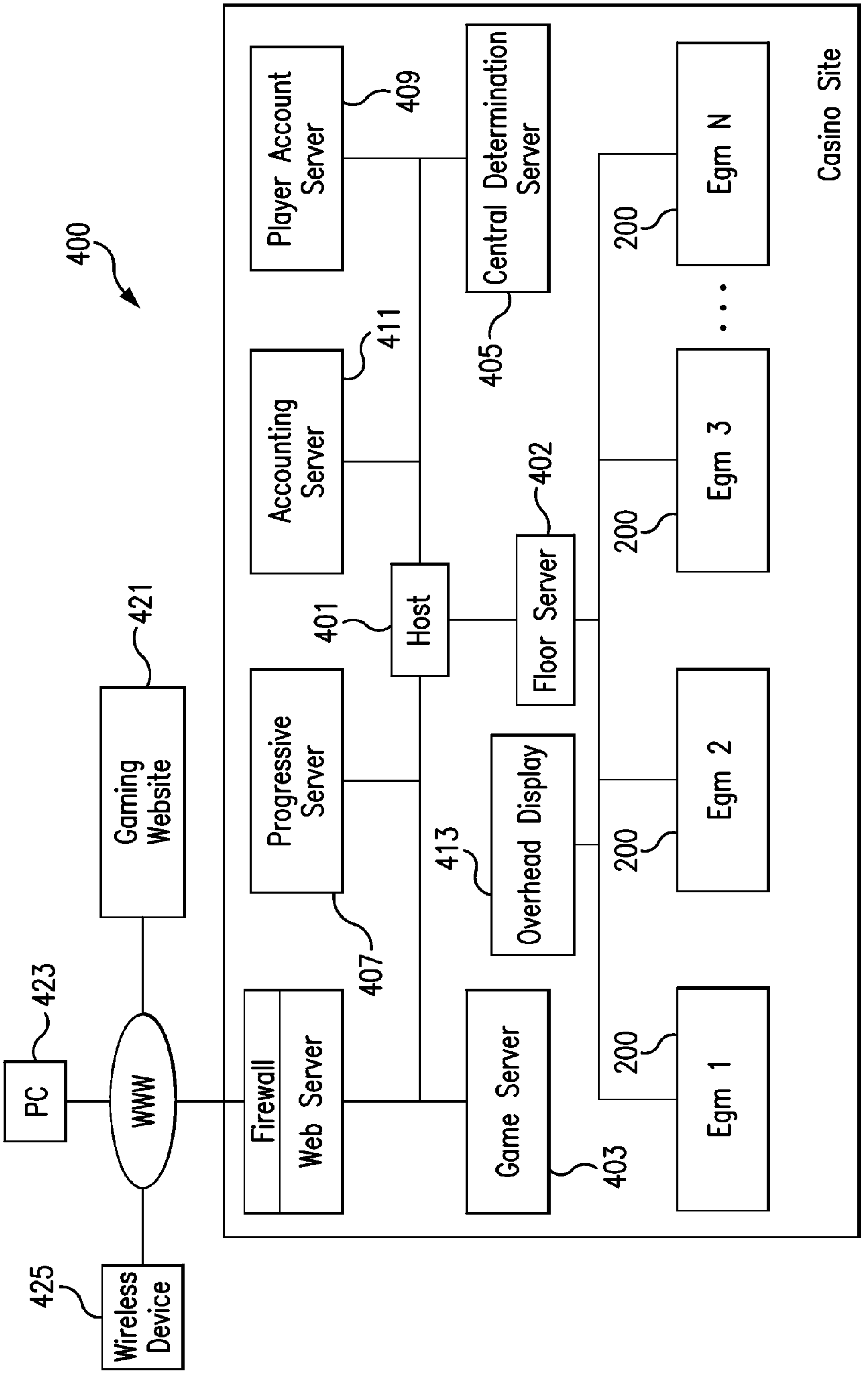
FIG. 4 is a diagrammatic representation of an example gaming network including one or more gaming machines with dual game play in accordance with one or more embodiments.

Referring to FIG. 4, a block diagram of example networked gaming system 400 associated with one or more gaming facilities is shown including one or more gaming machines 200 connected in a network with host server 401 and floor server 402. One or more of the gaming machines 200 may provide a base game 103 and side game 105 as discussed above. While a few servers have been shown separately in FIG. 4, it will be appreciated that the servers may be combined or split into additional servers having additional capabilities.

As shown, networked gaming machines 200 (Egm 1-Egm N) and one or more overhead displays 413 may be network connected so as to enable the content of one or more displays of gaming machines 200 to be mirrored or replayed on overhead display. For example, the primary display content may be stored by the display controller or game processor 301 and transmitted through network controller 307 (FIG. 3) to the overhead display controller either substantially simultaneously or at a subsequent time according to either programming executed by game processor 301 (FIG. 3) or a triggering event, such as a jackpot or large win, at a respective gaming machine 200. In the event that gaming machines 200 have cameras installed, the respective players' video images may be displayed on overhead display 413 along with the content of the player's display 100 and any associated audio feed.

Game server 403 may provide server-based games and/or game services to network connected gaming devices, such as gaming machines 200 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event such as a progressive jackpot game outcome or other triggering event such as a random or pseudo-random win determination at a networked gaming device or server (to provide a large potential award to players playing the community feature game for example). Accounting server 411 may receive gaming data from each of the networked gaming devices, perform audit functions, and provide data for analysis programs, such as the IGT Mariposa™ program bundle. Central determination server 405 may be configured to determine lottery, bingo, or other centrally determined game outcomes and provide the information to networked gaming machines 200 providing lottery and bingo-based wagering games to patrons.

Player account server 409 may maintain player account records, and store persistent player data such as accumulated player points and/or player preferences such as game personalizing selections or options. For example, the player tracking display may be programmed to display a player menu that may include a choice of personalized gaming selections that may be applied to a gaming machine 200 being played by the player.

In one or more embodiments, the player menu may be programmed to display after a player inserts a player card into the card reader. When the card is inserted, an identification code may be read from the card and transmitted to player account server 409. Player account server 409 may then cause player information to be transmitted through network controller 307 (FIG. 3) for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 301 for storing and use during the player's game play. Also, the player's selection may be transmitted to player account server 409 where it may be stored in association with the player's account for transmission to the player in future gaming sessions. The player may change selections at any time using the player tracking display at the gaming machine (which may be touch sensitive or have player-selectable buttons associated with the various display selections).

In one or more embodiments, a gaming website 421 may be accessible to players to allow players to play one or more games as described herein through the use of personal computer 423 or handheld wireless device 425 (e.g. Blackberry® cell phone, Apple Iphone®, personal data assistant (PDA), iPad®, etc.). To enter the website, a player may log in with a user name (that may be associated with the player's account information stored on player account server 409 or be accessible by a casino operator to obtain player data and provide promotional offers). Once logged in, the player may play various games on the website. The play may also use the website to make various personalizing selections and save the information so that during a next gaming session at a casino establishment the player's playing data and personalized information may be associated with the player's account and accessible at the player's selected gaming machine 200.

Referring generally to the forgoing description and the following claims, as used herein the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "presentation" as used herein is meant to refer to the display of any image and/or video performance and/or the performance of one or more sound bites or audio tracks (such as digital or analog sound tracks or information stored on a memory device and processed by an audio controller to emit sound through a speaker) whether in an attract mode or as part of a game presentation or outcome.

The above described example embodiments are intended to illustrate the principles of the invention, but not to limit the scope of the invention. Various other embodiments and modifications to these preferred embodiments may be made by those skilled in the art without departing from the scope of the present invention. For example, side game 105 may include a lottery game which may comprise a traditional ticket with a random selection of numbers which may be matched with a randomly drawn set of numbers or a representation of the outcome with a different type of game, such as a card, reel, or wheel game. In another example, one of base game 103 and side game 105 may be determinable by one processor (e.g. a local processor) and the other game may be determinable by another processor (e.g. a remote processor) while one of the processors or another processor may drive a presentation to be displayed on display 100 including base game 103 and side game 105 and culminating in outcomes according to the determinations.

In addition to the variations described above, the following variations also apply to the side game arrangement disclosed herein. Besides viewing the side game 105 as just a secondary game or separate second game, the side game could also be a part of the base game that is engaged with a feature bonus bet. Also the side game 105 could be a part of the primary game where one bet gets both games at the same time every time, with no decision by the player. In this case, one button (or other control) could activate both games without an additional wager. The results of the side game 105 may provide additional benefits in the base game 103 or vice versa. The side game 105 could be a lottery or scratch off ticket type game. In other embodiments the more a player plays the side game 105 (in one session of playing) the easier winning the biggest prize gets or the bigger the awards get. That is, the paytable and the probabilities associated with each award level may change depending upon how many times the side game 105 is played in a give gaming session by a player. The side game 105 could be linked with other side games provided at different gaming machines and may pay progressive or mystery awards. The gaming machine may provide the player with a menu of side games from which the player may choose. The player may decide to remove side action completely from the screen, or they could elect to add side games to their primary game. A side game could be added to a video poker base game where the side game is a reel-type game. Several windows may be added to a base game display (video display) with a respective side game being played concurrently with the base game and each other side game. A side game could be a pop-n-win type game where as a balloon (or something similar) appears in the side game area during the course of the base game and the player has to do something to win the bonus or prize for the game, such as popping a video-generated balloon. The player may have to perform some activity within the side game such as select a bowling ball for a bowling side game or a choose color for a roulette-type side game. The side game could be connected to overhead signage and the results could be broadcasted on the bigger display or used for progressives. The live cameras on the gaming machines could be used within the side game. For example, a side game could display camera feeds showing one player in the gaming network after another and may then stop on one of the camera feeds showing a given player, whereupon that player wins a bonus. The side game could be added on a second or other display device rather than the display used to show the base game. For example, the side game could be shown on a topbox display of the gaming machine, or a side game could be on a display next to mechanical reels. In other embodiments, a certain percentage of money played on the base game is accrued and can be used for wagers on the side action game or games. Also, the amount of the side wager for the side game may be selectable by the player.

The invention claimed is:

1. A method of providing wagering games through a gaming machine, the method including:

(a) simultaneously displaying a base game graphic for a base game and a side game graphic for a side game, both the base game graphic and the side game graphic being displayed on a display system of the gaming machine, the base game graphic being displayed under control of a first processing device associated with the gaming machine and the side game graphic being displayed under control of the first processing device or a second processing device associated with the gaming machine;

(b) for a play in the base game, modifying the base game graphic under control of the first processing device to display a base game outcome presentation correlated to a base game outcome for the base game;

(c) over a common period of time with modifying the base game graphic, modifying the side game graphic under control of the first processing device or the second processing device to display a side game outcome presentation correlated to a side game outcome for the side game, the base game outcome being distinct from the side game outcome;

(d) in response to a side game modification symbol appearing in the base game outcome presentation, applying a side game modification to one or more instances of the side game, or in response to a base game modification symbol appearing in the side game outcome presentation, applying a base game modification to one or more instances of the base game; and (e) displaying through the display system the award of any cash or credit prize correlated to the base game outcome presentation and the award of any cash or credit prize correlated to the side game outcome presentation.

2. The method of claim 1 wherein the side game modification symbol includes a free play symbol and wherein applying the side game modification to the side game includes adding a free play outcome as an available outcome in an instance of the side game, the free play outcome being associated with a number of free plays.

3. The method of claim 2 further including applying the number of free plays associated with the free play outcome as free plays in the base game.

4. The method of claim 2 further including modifying the number of free plays associated with the free play outcome based upon a number of side game modification symbols appearing in the base game outcome presentation.

5. The method of claim 1 wherein the side game modification symbol includes a free play symbol and wherein applying the side game modification to the side game includes triggering a free play in the side game.

6. The method of claim 1 wherein the side game modification symbol includes a multiplier symbol and wherein applying the side game modification to the side game includes applying a multiplier to an award in the side game.

7. The method of claim 1 wherein the side game modification symbol includes a multiplier symbol and wherein applying the side game modification to the side game includes modifying a multiplier defined for the side game.

8. The method of claim 1 further including saving the side game modification and wherein applying the side game modification to one or more instances of the side game includes applying the side game modification to a future instance of the side game.

9. A gaming machine including:

(a) a display system;

(b) a player input system;

(c) at least one processor; and (d) at least one memory device storing instructions executable by the at least one processor to:

(i) simultaneously display a base game graphic for a base game and a side game graphic for a side game, both the base game graphic and the side game graphic being displayed on the display system under control of the at least one processor;

(ii) for a play in the base game, cause the display system to modify the base game graphic to display a base game outcome presentation correlated to a base game outcome for the base game;

(iii) over a common period of time with modifying the base game graphic, cause the display system to modify the side game graphic to display a side game outcome presentation correlated to a side game outcome for the side game, the base game outcome being distinct from the side game outcome;

(iv) in response to a side game modification symbol appearing in the base game outcome presentation, apply a side game modification to one or more instances of the side game, or in response to a base game modification symbol appearing in the side game outcome presentation, apply a base game modification to one or more instances of the base game; and (v) cause the display system to display the award of any cash or credit prize correlated to the base game outcome presentation and to display the award of any cash or credit prize correlated to the side game outcome presentation.

10. The gaming machine of claim 9 wherein the side game modification symbol includes a free play symbol and wherein the side game modification is applied to the side game by adding a free play outcome as an available outcome in an instance of the side game, the free play outcome being associated with a number of free plays.

11. The gaming machine of claim 10 wherein the instructions are also executable to apply the number of free plays associated with the free play outcome as free plays in the base game.

12. The gaming machine of claim 10 wherein the instructions are also executable to modify the number of free plays associated with the free play outcome based upon a number of side game modification symbols appearing in the base game outcome presentation.

13. The gaming machine of claim 9 wherein the side game modification symbol includes a free play symbol and wherein the side game modification is applied to the side game to trigger a free play in the side game.

14. The gaming machine of claim 9 wherein the side game modification symbol includes a multiplier symbol and wherein the side game modification is applied to the side game by applying a multiplier to an award in the side game.

15. The gaming machine of claim 9 wherein the side game modification symbol includes a multiplier symbol and wherein the side game modification is applied to the side game by modifying a multiplier defined for the side game.

16. The gaming machine of claim 9 wherein the instructions are also executable to save the side game modification and wherein the side game modification is applied to one or more instances of the side game by applying the side game modification to a future instance of the side game.

* * * * *